(12) United States Patent
Grasso et al.

(10) Patent No.: US 10,886,815 B2
(45) Date of Patent: Jan. 5, 2021

(54) ELECTRICAL CONNECTOR AND MOTOR HAVING THE SAME

(71) Applicant: Johnson Electric S.A., Murten (CH)

(72) Inventors: Bruno Grasso, Asti (IT); Carlo Canuto, Asti (IT)

(73) Assignee: JOHNSON ELECTRIC INTERNATIONAL AG, Murten (CH)

(*) Notice: Subject to any disclaimer, the term of this patent is extended or adjusted under 35 U.S.C. 154(b) by 592 days.

(21) Appl. No.: 15/698,152

(22) Filed: Sep. 7, 2017

(65) Prior Publication Data

US 2018/0069449 A1 Mar. 8, 2018

(30) Foreign Application Priority Data

Sep. 7, 2016 (IT) .................. 102016000090442

(51) Int. Cl.
| | |
|---|---|
| *H02K 5/22* | (2006.01) |
| *H01R 9/28* | (2006.01) |
| *H01R 13/73* | (2006.01) |
| *H02K 11/02* | (2016.01) |
| *H02K 11/20* | (2016.01) |
| *H02K 11/33* | (2016.01) |
| *H02K 3/50* | (2006.01) |
| *H02K 3/52* | (2006.01) |
| *H02K 11/26* | (2016.01) |

(52) U.S. Cl.
CPC ............... *H02K 5/225* (2013.01); *H01R 9/28* (2013.01); *H01R 13/73* (2013.01); *H02K 3/50* (2013.01); *H02K 3/522* (2013.01); *H02K 11/20* (2016.01); *H02K 11/33* (2016.01); *H01R 2201/26* (2013.01); *H02K 11/02* (2013.01); *H02K 11/26* (2016.01); *H02K 2203/03* (2013.01)

(58) Field of Classification Search
CPC .... H01R 13/6625; H01R 13/719; H01R 9/28; H01R 13/73; H01R 13/665; H01R 13/68; H01R 13/684; H01R 13/688; H01R 13/696; H02K 5/225; H02K 11/20; H02K 11/33; H02K 3/50; H02K 3/522; H02K 11/26; H02K 11/02; H02K 2201/26; H02K 2201/03
See application file for complete search history.

(56) References Cited

U.S. PATENT DOCUMENTS

| | | | | |
|---|---|---|---|---|
| 5,982,253 A | * | 11/1999 | Perrin ................. | H01R 13/719 333/182 |
| 2002/0053843 A1 | * | 5/2002 | Sunaga ................ | H02K 3/50 310/68 R |

(Continued)

FOREIGN PATENT DOCUMENTS

| | | |
|---|---|---|
| JP | 5501699 B2 | 5/2014 |
| WO | WO2016135393 A1 | 9/2016 |

*Primary Examiner* — Nguyen Tran
*Assistant Examiner* — Paul D Baillargeon
(74) *Attorney, Agent, or Firm* — Muncy, Geissler, Olds & Lowe, P.C.

(57) ABSTRACT

An electrical connector for an electric motor, includes an insulating main body with a front side configured to be coupled with the motor and a rear side configured to be coupled with a corresponding wiring harness, a plurality of electrical terminals fixed by the main body, and at least one current protection element. The at least one current protection element is positioned in the main body.

16 Claims, 10 Drawing Sheets

(56) References Cited

U.S. PATENT DOCUMENTS

| | | | |
|---|---|---|---|
| 2012/0286605 A1* | 11/2012 | Miyachi | B62D 5/0406 |
| | | | 310/71 |
| 2015/0180316 A1* | 6/2015 | Maeshima | B62D 5/0406 |
| | | | 310/71 |
| 2015/0357886 A1* | 12/2015 | Ishizeki | H02K 11/04 |
| | | | 310/71 |
| 2016/0268875 A1* | 9/2016 | Roos | H02K 5/10 |

* cited by examiner

ELECTRICAL CONNECTOR AND MOTOR HAVING THE SAME

CROSS REFERENCE TO RELATED APPLICATIONS

This non-provisional patent application claims priority under 35 U.S.C. § 119(a) from patent application Ser. No. 10/2016000090442 filed in Italy on Sep. 7, 2016, the entire contents of which are hereby incorporated by reference.

FIELD OF THE INVENTION

This invention relates to an electrical connector and a motor having the same, in particular, to a brushless motor.

BACKGROUND OF THE INVENTION

An electric motor receives power and control signals through a connection device which is only able to ensure an electrical connection between motor terminals and ends of a wiring harness. The connection device transmits the power and control signals to the motor.

The motor may include an overcurrent protection component, such as a fuse, in order to prevent damage to the motor due to an incorrect power supply. Generally, the fuse is directly installed on a circuit board integrated into the motor.

However, the operation for installing the fuse must be cautious, and is liable to damage the circuit board of the motor. Furthermore, when the fuse is irreparably damaged, an operation for replacing the fuse is necessary. The operation also requires caution, and is liable to damage the circuit board of the motor.

SUMMARY OF THE INVENTION

Hence there is a desire for an electrical connector and a motor, which make it possible to remedy this problem.

Accordingly, in one aspect thereof, the present invention provides an electrical connector for an electric motor. The electric motor comprises a seat in which a plurality of motor terminals fixed. The electrical connector comprises an electrically insulating main body, a plurality of electrical terminals fixed by the main body, and at least one current protection element positioned in the main body. The main body comprises a front side configured to be coupled with the motor, and a rear side configured to be coupled with a corresponding wiring harness. The electrical terminals comprises a plurality of front ends configured to connect corresponding motor terminals, and a plurality of rear ends configured to connect corresponding ends of the wiring harness.

Preferably, the electrical connector further comprises at least one electromagnetic suppression element, which is positioned in the main body.

Preferably, the at least one current protection element is a fuse, and the at least one electromagnetic suppression element is an electrolytic capacitor.

Preferably, the main body comprises a first housing with an open side for mounting the at least one current protection element, and a second housing with an open side for mounting the at least one electromagnetic suppression element.

Preferably, the first housing and the second housing are adjacent in a horizontal direction of the electrical connector.

Preferably, the first housing comprises a division plate, which divides an interior of the first housing into a first portion and a second portion, the first portion being configured to accommodate the current protection element, the second portion being configured to accommodate the rear ends of the electrical terminal.

Preferably, the open side of the first housing is a top side or a bottom side of the first housing, and the open side of the second housing is a rear side or a front side of the second housing.

Preferably, the main body further comprises a first cover and a second cover, the first cover being mounted on the open side of the first housing, the second cover being mounted to the open side of the second housing.

Preferably, the electrical terminals are fixed by the first housing.

Preferably, the electrical terminals comprise a first power terminal and a second power terminal, the first power terminal comprises a first segment and a second segment, and the first segment and the second segment are connected through the current protection element.

Preferably, the second segment is substantially parallel to the first segment in a horizontal direction of the electrical connector.

Preferably, the second power terminal comprises a first portion, a second portion, and a connection portion substantially perpendicular to the two portion and connected therebetween.

Preferably, the first power terminal further comprises a first extension part, the second power terminal further comprises a second extension part, and the at least one electromagnetic suppression element is connected between the first extension part and the second extension part.

Preferably, the main body is stably mounted on the seat, and the front ends of each electrical terminal directly contact the motor terminals without welding.

Preferably, the main body further comprises a retention frame extending horizontally forward from the main body, configured to engage with the motor.

Accordingly, in another aspect thereof, the present invention provides an electrical motor. The motor comprises a seat in which a plurality of motor terminals are fixed, and an electrical connector. The electrical connector comprises an electrically insulating main body, a plurality of electrical terminals fixed by the main body, and at least one current protection element positioned in the main body. The main body comprises a front side configured to be coupled with the motor, and a rear side configured to be coupled with a corresponding wiring harness. The electrical terminals comprises a plurality of front ends configured to connect corresponding motor terminals, and a plurality of rear ends configured to connect corresponding ends of the wiring harness.

Preferably, the motor is a brushless motor.

In the embodiments of the present disclosure, the current protection element is mounted in the electrical connector. An operation for mounting the current protection element will be simple and will not damage a circuit board of the motor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of FIG. 1 is a perspective view of an electric motor according to a preferably embodiment of the present invention.

DETAILED DESCRIPTION OF THE PREFERRED EMBODIMENTS

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention.

It is noted that, when a component is described to be "fixed" to another component, it can be directly fixed to the another component or there may be an intermediate component. When a component is described to be "connected" to another component, it can be directly connected to the another component or there may be an intermediate component. When a component is described to be "disposed" on another component, it can be directly disposed on the another component or there may be an intermediate component. The directional phraseologies such as "perpendicular", "horizontal", "left", "right" or similar expressions are for the purposes of illustration only.

Unless otherwise specified, all technical and scientific terms have the ordinary meaning as understood by people skilled in the art. The terms used in this disclosure are illustrative rather than limiting. The term "and/or" as used in this disclosure means that each and every combination of one or more associated items listed are included.

Figure 1:
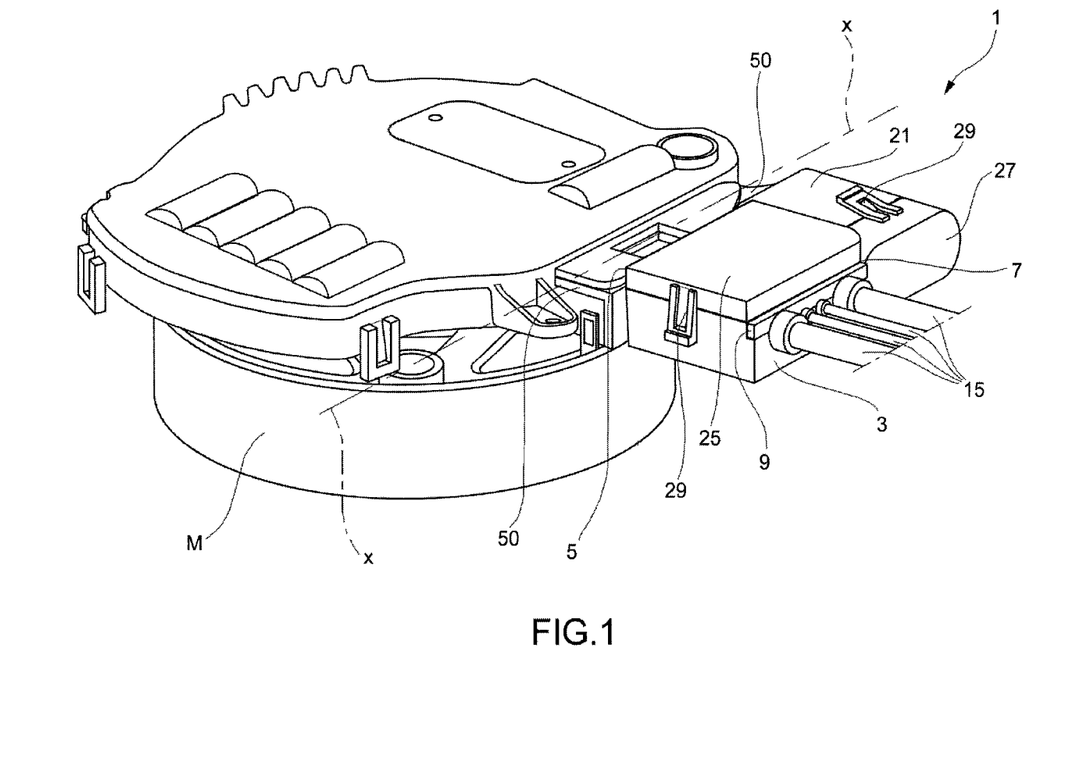
Figure 2:
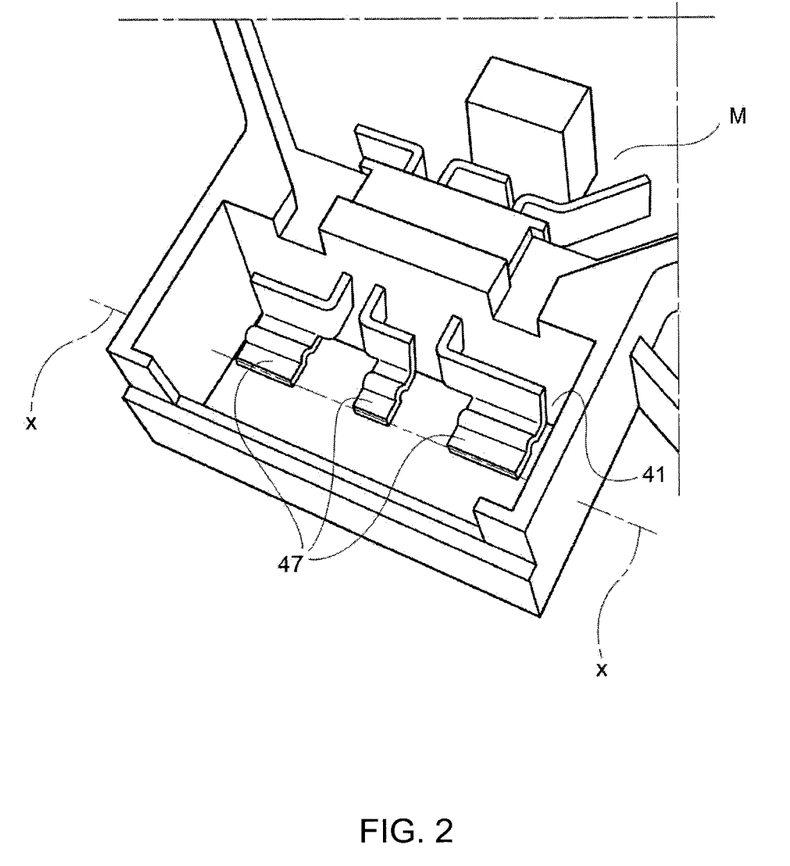
FIG. 2 is a perspective view of a seat of the electric motor of FIG. 1.

Referring to FIG. 1, the electrical connector 1 is configured for connecting a motor M and a wiring harness 9. Preferably, the electric motor M is a brushless motor, and configured for driving blades of a fan unit of a motor vehicle. Referring to FIG. 2, the motor M includes a seat 41 for coupling with the electrical connector 1. A plurality of motor terminals 47 of the motor M are fixed in the seat 41, for receiving power supply and/or control signals, and thus driving the motor M and/or controlling rotation parameters of the motor M, such as rotation speed, rotation direction, rotation angle, etc. Preferably, the motor terminals 47 are mutually aligned in a predetermined direction x-x.

Correspondingly, the wiring harness 9 includes a plurality wires for transmitting a power source which may be from a battery (not shown) of a vehicle, and/or control signals which may be from a control unit (not shown). In the embodiment, the wiring harness 9 is coupled to the electrical connector 1 by interlocking In alternative embodiments, the wiring harness 9 may be coupled to the electrical connector 1 by other ways, such as by screwing. In alternative embodiments, the wiring harness 9 also may be a plug or socket. A corresponding socket or plug (not shown) may be fixed on the electrical connector 1. The wiring harness 9 may be connected to the electrical connector 1 by engaging to the socket or plug.

The electrical connector 1 includes a substantially rigid main body 3, which is made of electrically insulating material. Preferably, the main body 3 is made of molded plastic material. The main body 3 includes a front side 5 configured to be coupled with the seat of the motor M, and a rear side 7 configured to be coupled with the wiring harness 9.

Figure 3:
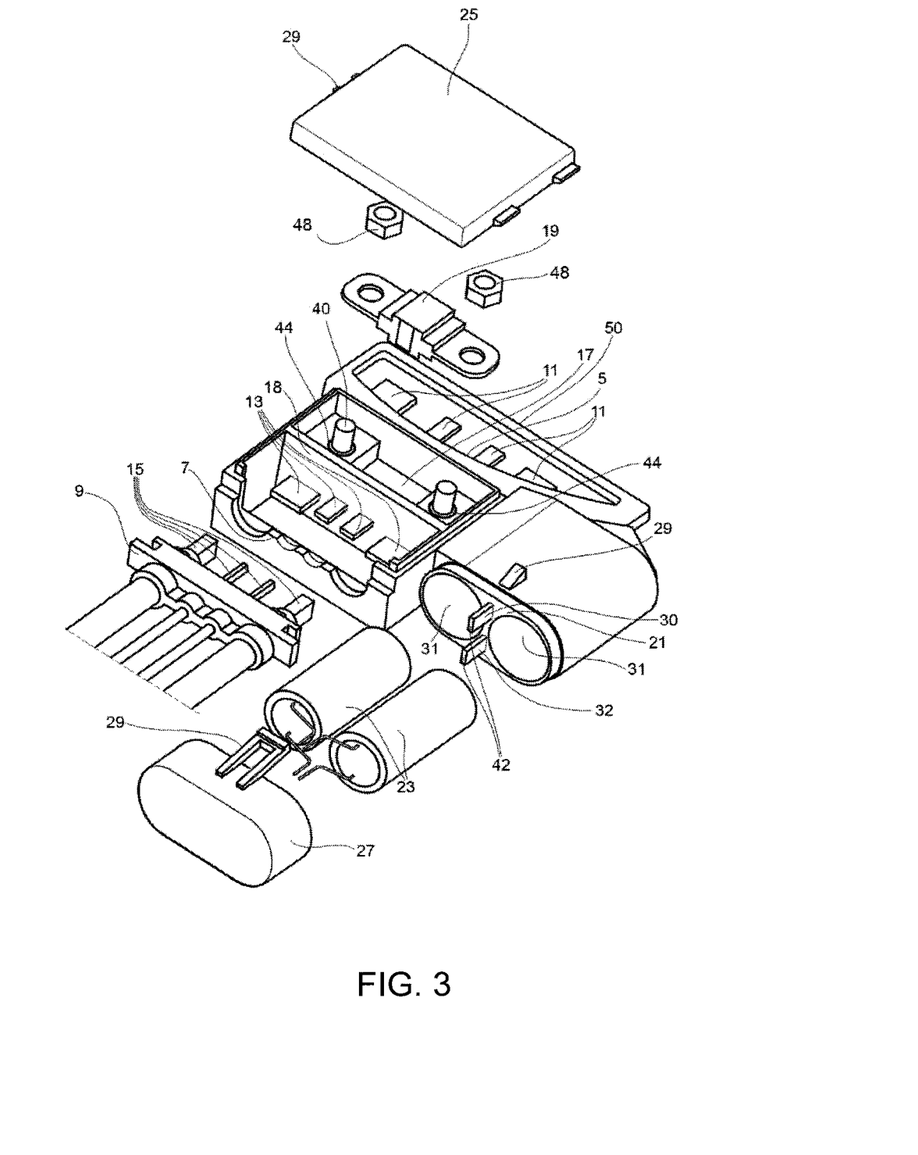
FIG. 3 is an exploded view of an electrical connector of the electric motor of FIG. 1.
Figure 4:
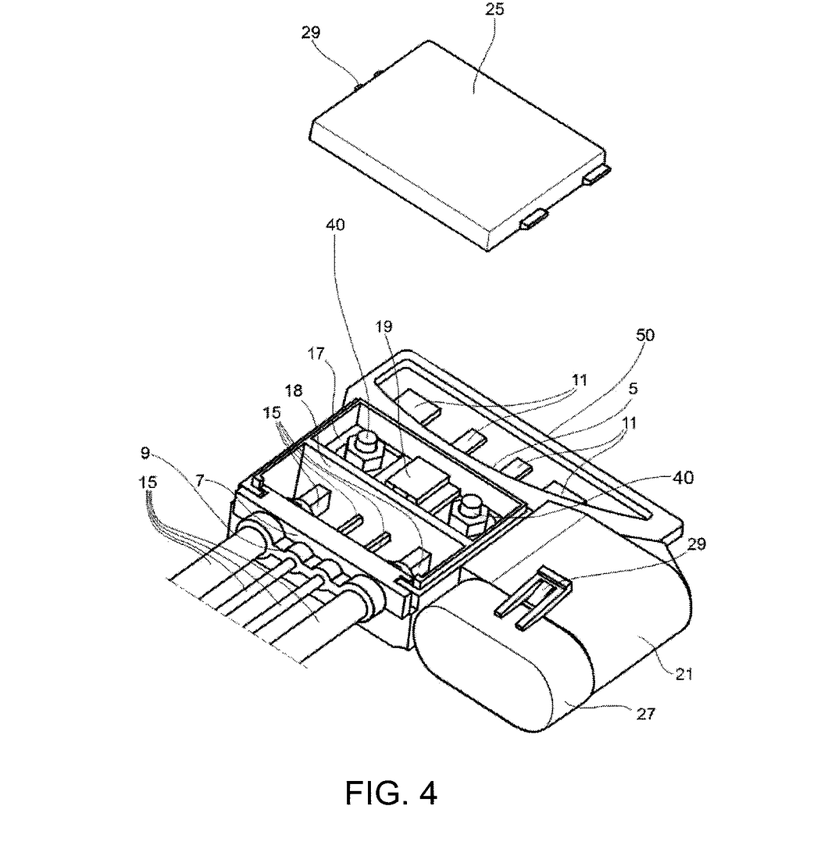
FIG. 4 is a perspective view of the electrical connector of FIG. 1, with a cover thereof removed.
Figure 5:
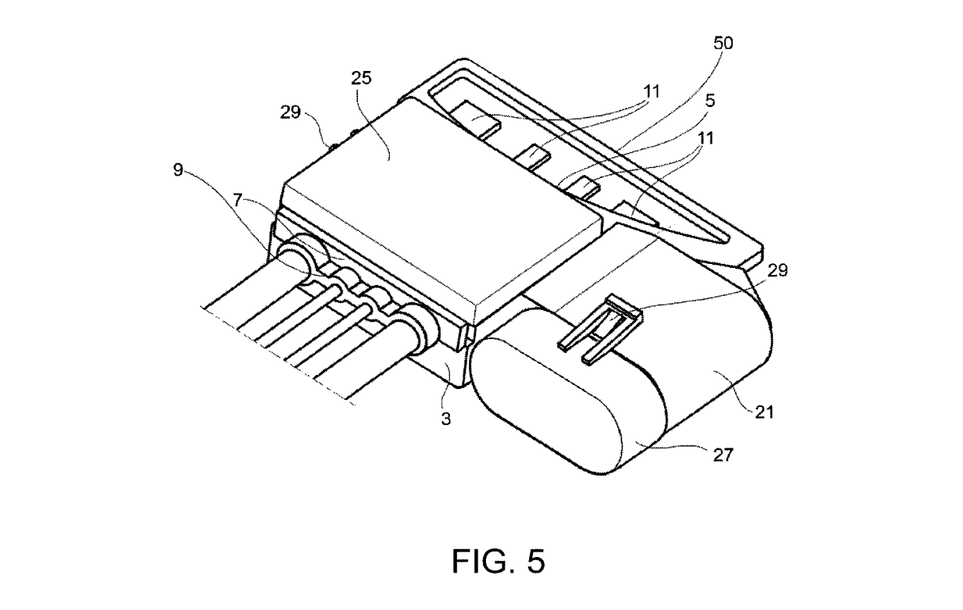
FIG. 5 is an assembled view of FIG. 3.
Figure 6:
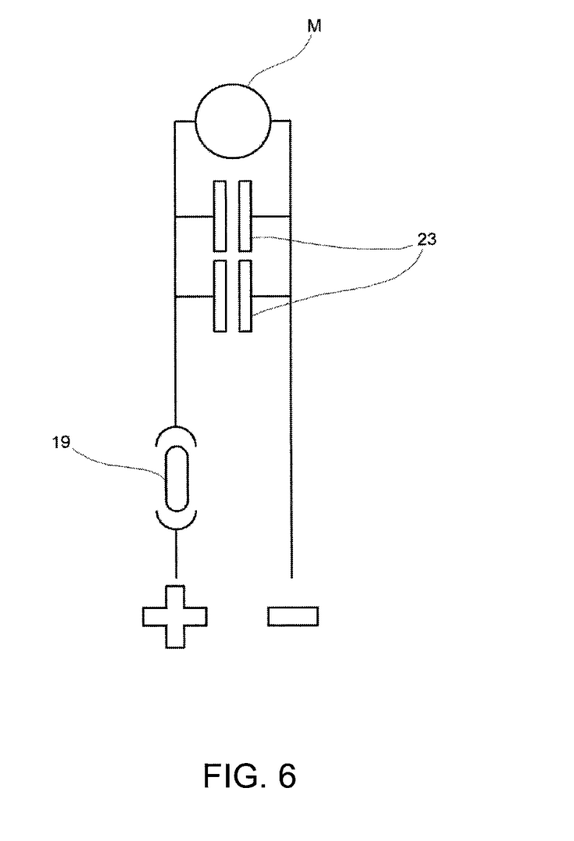
FIG. 6 is an electrical diagram of the electric motor of FIG. 1.

Referring to FIG. 3 to FIG. 5, the main body 3 includes a first housing (not labeled). A plurality of mutually electrically insulated electrical terminals 10 are fixed by the first housing, with front ends 11 protruded from the front side of the first housing and rear ends 13 located in the first housing. The frond ends 11 are configured to connect corresponding motor terminals 47. The second ends 13 are configured to connect corresponding ends 15 of the wiring harness 9.

The first housing has a top side (not labeled) and a bottom side (not labeled), at least one of which is open. The open side is convenient for mounting and connecting at least one current protection element 19, further for replacing in the condition that the current protection element 19 is damaged or faulted. In the embodiment, the top side is open. The first housing includes a first mounting portion 17 for accommodating the current protection element 19. The current protection element 19 may be a fuse. Preferably, the first housing further includes a division plate 18, which divides the interior of the first housing into a first portion and a second portion. The first portion is the first mounting portion 17, configured to accommodate the current protection element 19. The second portion (not labeled) is configured to accommodate the rear ends 13 of the electrical terminal 10. The rear ends 13 of the electrical terminal 10 protrude from the division plate 18 to connect with corresponding ends of the wiring harness 9.

The current protection element 19 is mounted in the electrical connector 1. An operation for mounting the current protection element 19 will be simple and will not damage a circuit board of the motor M.

Preferably, the main body 3 further includes a second housing 21 with a front side (not labeled) and a rear side (not labeled), at least one of which is open. The open side is convenient for mounting and connecting at least one electromagnetic suppression element 23 for suppressing electromagnetic interference, further for replacing in the condition that the electromagnetic suppression element 23 is damaged or faulted. In the embodiment, the rear side of the second housing 21 is open. At least one second mounting portion 31 extends from the open rear side to the closed front side, configured to accommodate at least one electromagnetic suppression element 23. In the embodiment, the at least one electromagnetic suppression element are two electrolytic capacitors. The at least one second mounting portion 31 are two cavities substantially in tubular shape, each of which accommodates an electrolytic capacitor. In the embodiment, the two mounting portions 17, 31 are separated with each other.

In the embodiment, the first housing and the second housing 21 are adjacent in a horizontal direction of the electrical connector 1, and thus the total thickness of the electrical connector 1 can be reduced. In alternative embodiments, the first housing and the second housing 21 can be arranged one above the other in a vertical direction of the electrical connector 1, and thus the total width of the electrical connector 1 can be reduced.

The main body 3 further comprises a first cover 25 and a second cover 27. The first cover 25 is mounted on the top side of the first housing. The second cover 27 is mounted to the rear side of the second housing. Preferably, the two housings are arranged to be firmly engaged with the covers 25, 27. In the embodiment, the housings and the corresponding covers are engaged by interlocking hooks 29. In alternative embodiments, the covers 25, 27 may be made integrated with the main body 3.

Referring to FIG. 6 to FIG. 10, the electrical terminals 10 includes a first power terminal 30 for receiving a first voltage, a second power terminal 32 for receiving a second voltage, and at least one signal terminal 34 for receiving control signals of the electric motor. In the embodiment, the first power terminal 30 is a positive terminal, and the second power terminal 32 is a negative terminal. There are two signal terminals.

Figure 7:
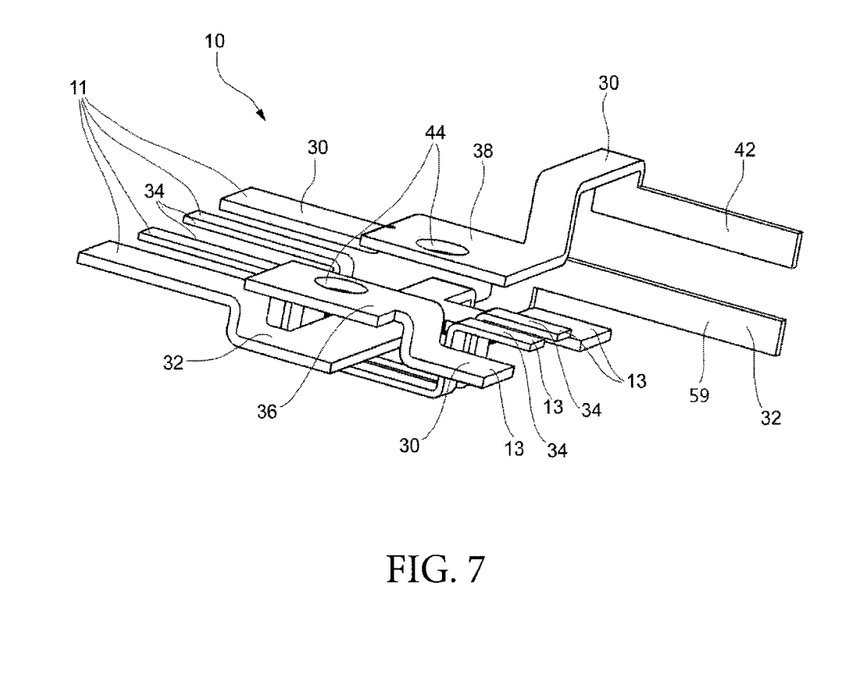
FIG. 7 is a perspective view of the electrical terminals of the electrical connector of FIG. 3.
Figure 8:
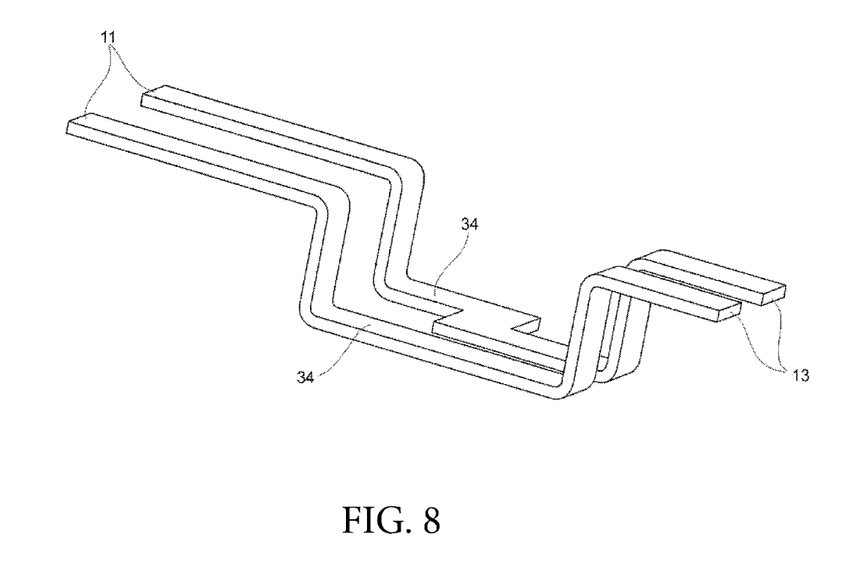
FIG. 8 is a perspective view of signal terminals of the electrical connector of FIG. 7.
Figure 9:
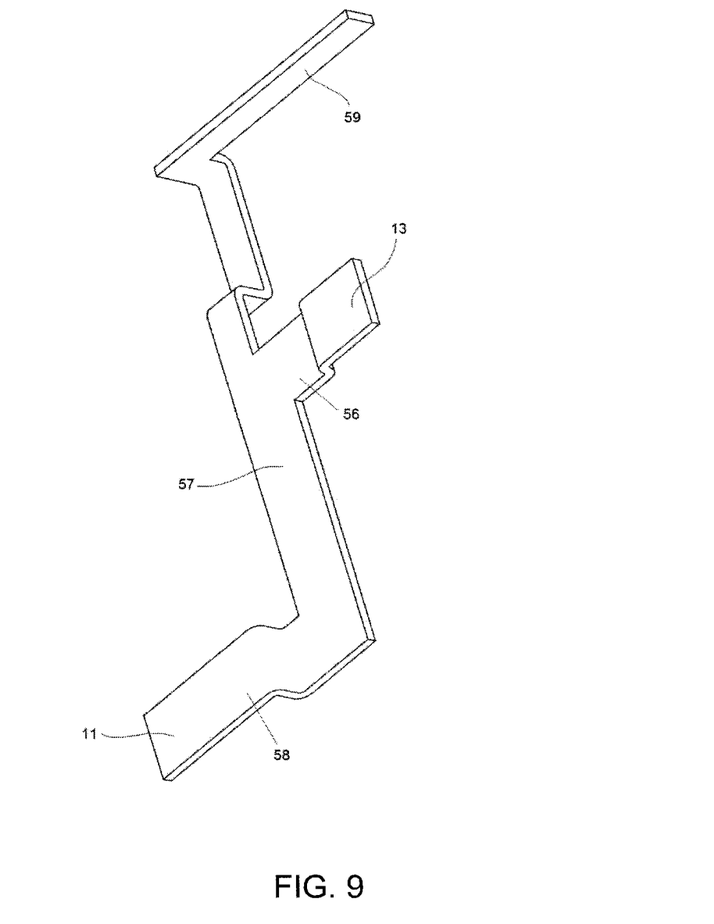
FIG. 9 is a perspective view of a power terminal of the electrical connector of FIG. 7.
Figure 10:
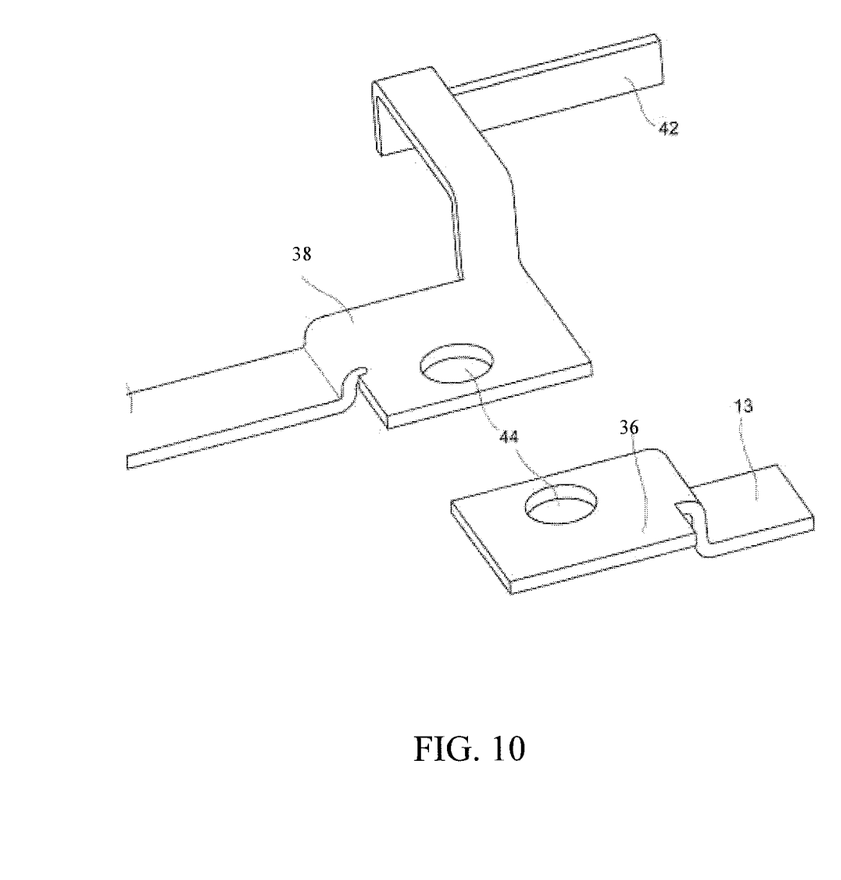
FIG. 10 is a perspective view of the other power terminal of the electrical connector of FIG. 7.

Preferably, the two power terminals 30, 32 have a size greater than the signal terminals 34, because the power terminals 30, 32 need to withstand greater voltages and currents. The first voltage and the second voltage are designed to create a potential difference to allow an activation of the electric motor M.

The first power terminal 30 includes a first segment 36 and a second segment 38. The first segment 36 and the second segment 38 are substantially parallel to each other in the horizontal direction of the electrical connector 1. A part of the first segment 36 is located in the first mounting portion 17, another part of the first segment 36 protrudes into the second portion of the first housing to be the rear end 13 of the first power terminal 30. A part of the second segment 38 is located in the first mounting portion 17, another part of the second segment 38 protrudes from the first housing to be the front end 11 of the first power terminal 30. The two segments 36, 38 are connected through the current protection element 19. The current protection element 19 has two ends (not labeled), respectively connected to the first segment 36 and the second segment 38.

In the embodiment, each of the segments 36, 38 has a first mounting hole 44. Each of the ends of the current protection element 19 has a second mounting hole (not labeled) corresponding to the first mounting hole 44. The current protection element 19 is fixed on the two segments 36, 38 by two screws 40 passing through the two holes, and two corresponding nuts 48.

The second power terminal 32 includes a first portion 58, a second portion 56, and a connection portion 57 substantially perpendicular to the two portions and connected therebetween. The first portion 58 and the second portion 56 are substantially parallel to each other in the horizontal direction of the electrical connector 1. The connection portion 57 is embedded in the first housing. The first portion 58 protrudes from the front side of the first housing to be the front end 11 of the second power terminal 32. The second portion 56 protrudes into the second portion of the first housing to be the rear end 13 of the second power terminal 32.

The first power terminal 30 further comprises a first extension part 42 protruding into the second housing 21. The second power terminal 32 further comprises a second extension part 59 protruding into the second housing. The electromagnetic suppression element 23 is connected between the two extension parts 42, 59.

In some embodiments, the electrical connector 1 may be stably mounted on the motor M by interlocking hooks, screws or other formations, so that the front ends 11 of the electrical terminals 10 can be stably connected with the motor terminals 47 only by direct contact. There is no need to weld the electrical terminals 10 and the motor terminals 47.

In some embodiments, the main body 3 may further include a retention frame 50 extending horizontally forward from the front side 5 of the main body 3, configured to engage with the motor M, and thus further ensuring the stable relationship between the electrical connector 1 and the motor M.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An electrical connector for an electric motor, wherein the electric motor comprises a seat in which a plurality of motor terminals fixed, the electrical connector comprises:
    an electrically insulating main body, comprising a front side configured to be coupled with the motor, and a rear side configured to be coupled with a corresponding wiring harness; and
    a plurality of electrical terminals fixed by the main body, comprising a plurality of front ends configured to connect corresponding motor terminals, and a plurality of rear ends configured to connect corresponding ends of the wiring harness;
    wherein the electrical connector further comprises at least one current protection element and at least one electromagnetic suppression element, which are positioned in the main body, and
    wherein the main body comprises:
        a first housing with an open side for mounting the at least one current protection element,
        a second housing with an open side for mounting the at least one electromagnetic suppression element;
        a first cover mounted to the open side of the first housing; and
        a second cover mounted to the open side of the second housing.

2. The electrical connector according to claim 1, wherein the at least one current protection element is a fuse, and the at least one electromagnetic suppression element is an electrolytic capacitor.

3. The electrical connector according to claim 1, wherein the first housing and the second housing are adjacent in a horizontal direction of the electrical connector.

4. The electrical connector according to claim 1, wherein the first housing comprises a division plate, which divides an interior of the first housing into a first portion and a second portion, the first portion being configured to accommodate the current protection element, the second portion being configured to accommodate the rear ends of the electrical terminal.

5. The electrical connector according to claim 1, wherein the open side of the first housing is a top side or a bottom side of the first housing, and the open side of the second housing is a rear side or a front side of the second housing.

6. The electrical connector according to claim 1, wherein the electrical terminals are fixed by the first housing.

7. The electrical connector according to claim 1, wherein the electrical terminals comprise a first power terminal and a second power terminal, the first power terminal comprises a first segment and a second segment, and the first segment and the second segment are connected through the current protection element.

8. The electrical connector according to claim 7, wherein the second segment is substantially parallel to the first segment in a horizontal direction of the electrical connector.

9. The electrical connector according to claim 7, wherein the second power terminal comprises a first portion, a second portion, and a connection portion substantially perpendicular to the two portion and connected therebetween.

10. The electrical connector according to claim 9, wherein the first power terminal further comprises a first extension part, the second power terminal further comprises a second extension part, and the at least one electromagnetic suppression element is connected between the first extension part and the second extension part.

11. The electrical connector according to claim 1, wherein the main body is stably mounted on the seat, and the front ends of each electrical terminal directly contact the motor terminals without welding.

12. The electrical connector according to claim 11, wherein the main body further comprises a retention frame extending horizontally forward from the main body, configured to engage with the motor.

13. An electrical motor, comprising a seat in which a plurality of motor terminals are fixed, and an electrical connector, wherein the electrical connector comprises:
- an electrically insulating main body, comprising a front side configured to be coupled with the motor, and a rear side configured to be coupled with a corresponding wiring harness; and
- a plurality of electrical terminals fixed by the main body, comprising a plurality of front ends configured to connect corresponding motor terminals, and a plurality of rear ends configured to connect corresponding ends of the wiring harness;
- wherein the electrical connector further comprises at least one current protection element and at least one electromagnetic suppression element, which are positioned in the main body, and wherein the main body comprises:
- a first housing with an open side for mounting the at least one current protection element;
- a second housing with an open side for mounting the at least one electromagnetic suppression element;
- a first cover mounted to the open side of the first housing: and
- a second cover mounted to the open side of the second housing.

14. The motor according to claim 13, wherein the motor is a brushless motor.

15. An electrical connector for an electric motor, wherein the electric motor comprises a seat in which a plurality of motor terminals fixed, the electrical connector comprises:
- an electrically insulating main body, comprising a front side configured to be coupled with the motor, and a rear side configured to be coupled with a corresponding wiring harness; and
- a plurality of electrical terminals fixed by the main body, comprising a plurality of front ends configured to connect corresponding motor terminals, and a plurality of rear ends configured to connect corresponding ends of the wiring harness,
- wherein the electrical connector further comprises at least one current protection element positioned in the main body,
- wherein the electrical terminals comprise a first power terminal and a second power terminal, the first power terminal comprises a first segment and a second segment, and the first segment and the second segment are connected through the current protection element, and
- wherein the second power terminal comprises:
  - a first portion;
  - a second portion; and
  - a connection portion substantially perpendicular to and connected between the first portion and the second portion.

16. The electrical connector according to claim 15, wherein the first power terminal further comprises a first extension part,
- wherein the second power terminal further comprises a second extension part, and
- wherein the at least one electromagnetic suppression element is connected between the first extension part and the second extension part.

* * * * *